(12) United States Patent
Yue

(10) Patent No.: US 9,527,373 B2
(45) Date of Patent: Dec. 27, 2016

(54) CORNER ASSEMBLY FOR TONNEAU COVER SYSTEM OF PICK-UP TRUCK

(75) Inventor: Shiawdar Shaun Yue, Cupertino, CA (US)

(73) Assignee: CYC ENGINEERING, INC., Fremont, CA (US)

( * ) Notice: Subject to any disclaimer, the term of this patent is extended or adjusted under 35 U.S.C. 154(b) by 1207 days.

(21) Appl. No.: 13/290,030

(22) Filed: Nov. 4, 2011

(65) Prior Publication Data

US 2013/0114997 A1 May 9, 2013

(51) Int. Cl.
 *F16B 1/00* (2006.01)
 *F16B 9/00* (2006.01)
 *F16L 41/00* (2006.01)
 *B60J 7/10* (2006.01)

(52) U.S. Cl.
 CPC .............. *B60J 7/102* (2013.01); *Y10T 403/42* (2015.01)

(58) Field of Classification Search
 CPC ........... F16B 12/40; F16B 12/44; F16B 12/46; F16B 12/48; F16B 12/50; F16B 7/00; F16B 2012/145; F16B 7/044; F16B 7/0446; B60J 7/102; B60P 7/02; A47F 5/005; A47G 1/10; Y10T 403/42; Y10T 403/72; Y10T 403/73
 USPC .................................................. 403/205, 206
 See application file for complete search history.

(56) References Cited

U.S. PATENT DOCUMENTS

| | | | | |
|---|---|---|---|---|
| 4,303,289 A | * | 12/1981 | Hardy ........................ | 312/348.2 |
| 4,636,105 A | * | 1/1987 | Johansson ..................... | 403/205 |
| 5,076,736 A | * | 12/1991 | Grewe et al. ................. | 403/295 |
| 5,275,458 A | * | 1/1994 | Barben et al. ........... | 296/100.18 |
| 5,457,929 A | * | 10/1995 | Kim ................................ | 52/834 |
| 5,735,068 A | * | 4/1998 | Houssian ........................ | 40/784 |
| 5,788,315 A | * | 8/1998 | Tucker ...................... | 296/100.16 |
| 5,845,859 A | * | 12/1998 | Sato ............... | 242/345 |
| 5,906,407 A | * | 5/1999 | Schmeichel ............. | 296/100.15 |
| 5,934,735 A | * | 8/1999 | Wheatley ................. | 296/100.01 |
| 6,024,401 A | * | 2/2000 | Wheatley et al. ....... | 296/100.18 |
| 6,257,647 B1 | * | 7/2001 | Ninness et al. .......... | 296/100.15 |
| 7,484,790 B2 | * | 2/2009 | Wheatley ................. | 296/100.16 |
| 7,607,714 B2 | * | 10/2009 | Wheatley ................. | 296/100.17 |
| 7,726,902 B1 | * | 6/2010 | Bongiovanni et al. ......... | 404/25 |
| 7,954,876 B2 | * | 6/2011 | Kosinski ......................... | 296/98 |
| 8,128,149 B1 | * | 3/2012 | Wolf et al. ............... | 296/100.16 |
| 8,172,477 B2 | * | 5/2012 | Damsi ........................... | 403/205 |
| 8,511,736 B2 | * | 8/2013 | Williamson et al. .... | 296/100.07 |
| 8,632,114 B2 | * | 1/2014 | Yue .......................... | 296/100.02 |
| 2008/0106114 A1 | * | 5/2008 | Wheatley ................. | 296/100.17 |

FOREIGN PATENT DOCUMENTS

| | | | | |
|---|---|---|---|---|
| GB | 2222220 A | * | 2/1990 | ............. G01B 7/04 |
| GB | 2300356 A | * | 11/1996 | |

* cited by examiner

*Primary Examiner* — Gregory Binda
*Assistant Examiner* — Nahid Amiri

(57) ABSTRACT

A corner assembly for a tonneau cover system of a pick-up truck is provided and has a corner member, a lid member and a lengthened cushion member. A connection surface of the corner member is formed with a stepped recess, and the lid member is embedded in the stepped recess to cover ribs and cavities in the stepped recess. The lengthened cushion member is L-shaped and attached to the connection surface of the corner member, the lid member and two surfaces of two adjacent frame members.

8 Claims, 6 Drawing Sheets

CORNER ASSEMBLY FOR TONNEAU COVER SYSTEM OF PICK-UP TRUCK

FIELD OF THE INVENTION

The present invention relates to a corner assembly for a tonneau cover system, and more particularly to a corner assembly for a tonneau cover system of a pick-up truck.

BACKGROUND OF THE INVENTION

A pick-up truck has a cargo box used to carry various cargos. Generally, the cargo box is covered by a tonneau cover which is releasably clamped to and extended above the cargo box, so as to protect the carried cargos from adverse weather and improve the aesthetic appearance of the pick-up truck. The tonneau covers can be classified into hard-top type and soft-top type, wherein the hard-top type tonneau cover has a hard top made of rigid material, such as metal, fiberglass or the like, while the soft-top type tonneau cover has a soft top made of flexible material, such as canvas, vinyl plastic or a weather-resistant fabric. Moreover, the tonneau cover can be designed to provide a foldable function to help a user to conveniently extend or store the tonneau cover.

Referring now to FIG. 1, a perspective view of a traditional foldable tonneau cover system of a pick-up truck is illustrated, wherein a tonneau cover system 10 is used to cover a cargo box 21 of a pick-up truck 20, and the tonneau cover system 10 comprises a plurality of frame sections 11, a plurality of cover portions 12, a plurality of hinges (not-shown) and a plurality of clamps (not-shown). Each of the cover portions 12 are suitably fixed on one of the corresponding frame sections 11, and can be simultaneously folded when the tonneau cover system 10 is folded. Each of the frame sections 11 is constructed by a plurality of frame members, all of which are made of metal (such as steel, stainless steel, copper, aluminum, equivalent rigid metal or alloy thereof), engineering plastic or even wood. One of the frame sections 11 can be pivotally connected to another adjacent frame section 11 through two or more of the hinges, so that all of the frame sections 11 can be adjusted to an extended position or a storage position. When the frame sections 11 are in the extended position, the frame sections 11 are horizontally extended on two side walls 22 and a tailgate 23 of the cargo box 21, so as to cover an inner space of the cargo box 21. When the frame sections 11 are in the storage position, the frame sections 11 are folded and stacked on a front end of the two side walls 22, so as to expose the inner space of the cargo box 21. Furthermore, the tonneau cover system 10 may optionally only include a single frame section and a single cover portion 12 covering thereon, wherein the cover portion 12 can be made of flexible or rigid material.

Referring now to FIG. 2, an exploded perspective view of a corner assembly of the traditional foldable tonneau cover system from an upside-down view angle is illustrated, wherein each of the frontmost and rearmost frame sections 11 has two corner assemblies 13 for connecting adjacent frame members 111 thereof. Each of the corner assemblies 13 has a corner member 131 and a cushion member 132. The corner member 131 has two insertion portions 133, each of which can be inserted into an installation hole of the frame member 111. A connection surface 134 of the corner member 131 is formed with a plurality of ribs 135 and a plurality of cavities 136. The cushion member 132 is attached to the connection surface 134 of the corner member 131 by an adhesive tape. Moreover, the frame sections 11 further has a plurality of cushion strips 14, wherein two of the cushion strips 14 are attached to the surfaces of the frame members 111 and adjacent to the cushion member 132. The cushion strips 14 have a thickness slightly smaller than that of the cushion member 132.

Referring now to FIG. 3, an operational view of the corner assembly of the traditional foldable tonneau cover system is illustrated. When the tonneau cover system 10 is horizontally extended on the side walls 22 and the tailgate 23 of the cargo box 21, a lower surface of the cushion member 132 of the corner assembly 13 will be tightly in contact with upper surfaces of the side walls 22 (and the tailgate 23) due to the gravity and the clamping force of the clamps. Thus, the cushion member 132 of the corner assembly 13 absorbs vibration and prevents from impact between the frame section 11 and the cargo box 21 and thus reduces noise generated due to the impact.

However, there are problems existing in the actual use of the structure of the traditional corner assembly 13, as follows: Due to the gravity and the clamping force of the clamps, the lower surface of the cushion member 132 of the corner assembly 13 is tightly in contact with the upper surfaces of the side walls 22. But, after long-time repetitive use, an upper surface of the cushion member 132 facing the connection surface 134 of the corner member 131 may be deformed because the clamping force from the frame members 111 and the clamps causes the ribs 135 of the corner member 131 to press and deform the upper surface of the cushion member 132. As a result, a portion of the upper surface of the cushion member 132 sinks into the cavities 136 of the corner member 131, so as to lower the effective buffering thickness of the entire cushion member 132. If the remaining effective buffering thickness of the cushion member 132 is insufficient, the frame section 11 may be in contact with the cargo box 21 to cause impact therebetween, so as to generate noise due to the impact.

As a result, it is necessary to provide an improved corner assembly for a tonneau cover system of a pick-up truck to solve the problems existing in the conventional technologies, as described above.

SUMMARY OF THE INVENTION

A primary object of the present invention is to provide a corner assembly for a tonneau cover system of a pick-up truck, which has a corner member, a lid member and a lengthened cushion member, wherein a connection surface of the corner member is formed with a stepped recess; the lid member is embedded in the stepped recess to cover ribs and cavities in the stepped recess; and the lengthened cushion member is L-shaped and attached to the connection surface of the corner member, the lid member and two surfaces of two adjacent frame members. Thus, it can efficiently maintain the effective buffering thickness of the lengthened cushion member, absorb vibration, and prevent from impact between frame members and a cargo box to thus reduce or eliminate noise.

To achieve the above object, the present invention provides a corner assembly for a tonneau cover system of a pick-up truck, which is used to connect two vertically-arranged frame members of the tonneau cover system and comprises:

a corner member having: two insertion portions inserted into two installation holes of the two adjacent frame members, respectively; and a connection surface formed with a stepped recess, a plurality of ribs and a plurality of cavities, wherein the ribs and the cavities are formed in the stepped recess;

a lid member stably embedded in the stepped recess to cover the ribs and the cavities; and a lengthened cushion member being L-shaped and having a corner cushion portion and two extension cushion portions integrally extended from two adjacent sides of the corner cushion portion, wherein the corner cushion portion is attached to the connection surface of the corner member and the lid member, and the two extension cushion portions are attached to two surfaces of a portion of the two adjacent frame members, respectively.

In one embodiment of the present invention, the corner member is further formed with at least one thread hole, and the lid member is formed with at least one through hole corresponding to the at least one thread hole.

In one embodiment of the present invention, further comprising: at least one screw member which passes through the through hole and screw-connects to the screw hole, so as to stably mount the lid member in the stepped recess of the corner member.

In one embodiment of the present invention, the at least one thread hole is formed on at least one of the ribs.

In one embodiment of the present invention, the lid member is formed with at least one protrusion, and the protrusion is embedded into at least one of the cavities in the stepped recess of the corner member.

In one embodiment of the present invention, further comprising: a buffering filler which is filled in the cavities and the stepped recess of the corner member, so as to stably mount the lid member in the stepped recess of the corner member.

In one embodiment of the present invention, the buffering filler is made of thermoplastic or thermosetting adhesive material capable of absorbing vibration, such as a foaming filler (such as synthesized latex) or a thermoplastic elastomer (TPE).

In one embodiment of the present invention, a plurality of ultrasonic welding portions are formed on a boundary region between the lid member and the stepped recess of the corner member.

In one embodiment of the present invention, a surface of the lengthened cushion member away from the lid member and the corner member is further provided with a soft magnetic sheet.

In one embodiment of the present invention, each of the corner cushion portion and the two extension cushion portions of the lengthened cushion member is provided with at least one hole to receive at least one rubber post.

In one embodiment of the present invention, the corner member and the lid member are made of plastic material.

In one embodiment of the present invention, the lengthened cushion member is made of synthetic sponge material.

In one embodiment of the present invention, the tonneau cover system has a plurality of frame sections, each of which has the frame members.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, and etc., are only directions by referring to the accompanying drawings, and thus the used directional terms are used to describe and understand the present invention, but the present invention is not limited thereto.

Figure 1:
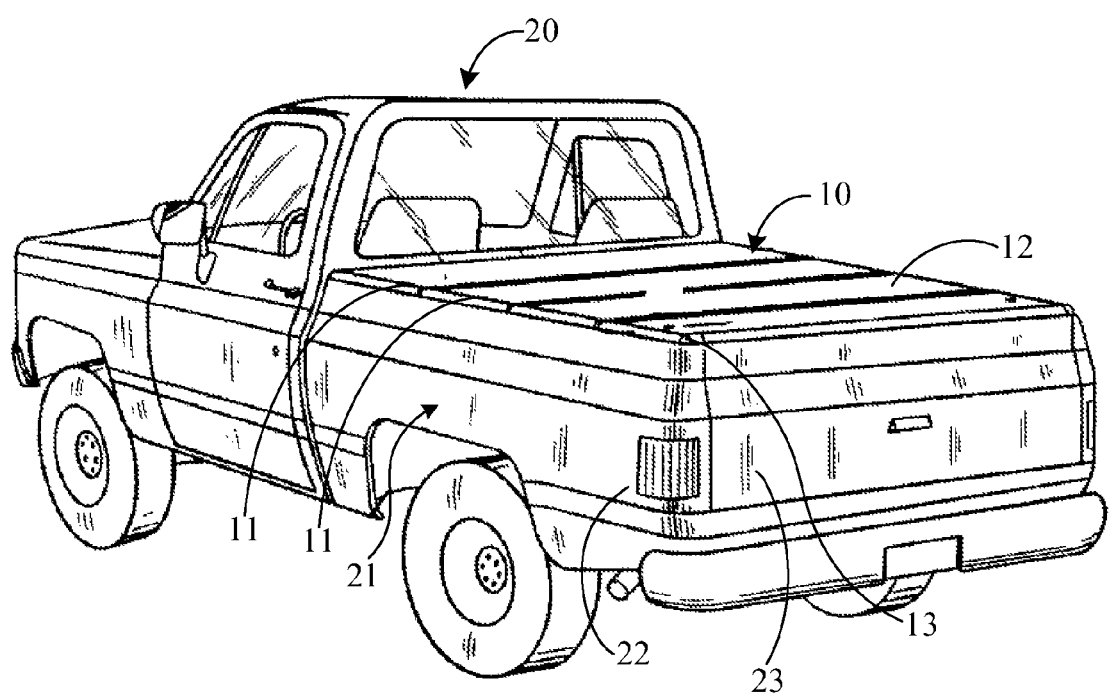
FIG. 1 is a perspective view of a traditional foldable tonneau cover system of a pick-up truck.
Figure 4:
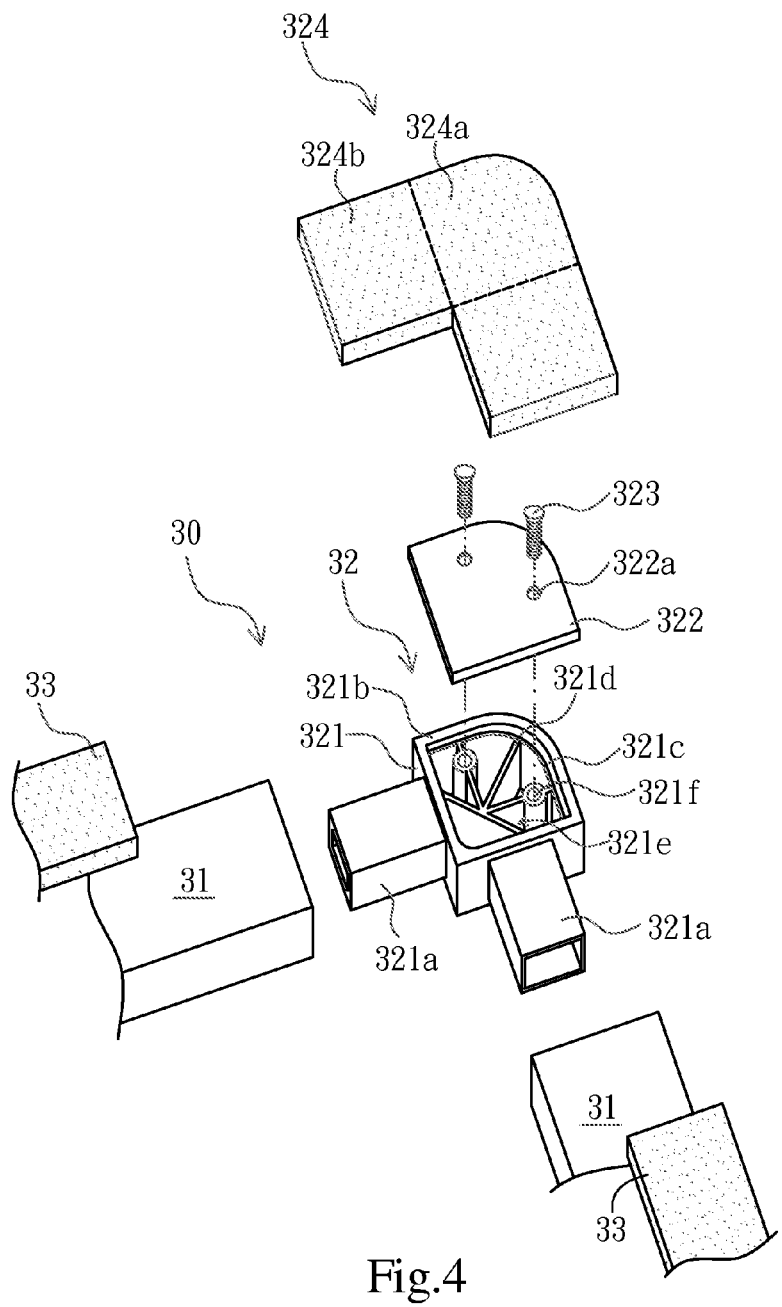
FIG. 4 is an exploded perspective view of a corner assembly of a tonneau cover system according to a first embodiment of the present invention, from an upside-down view angle.
Figure 5:
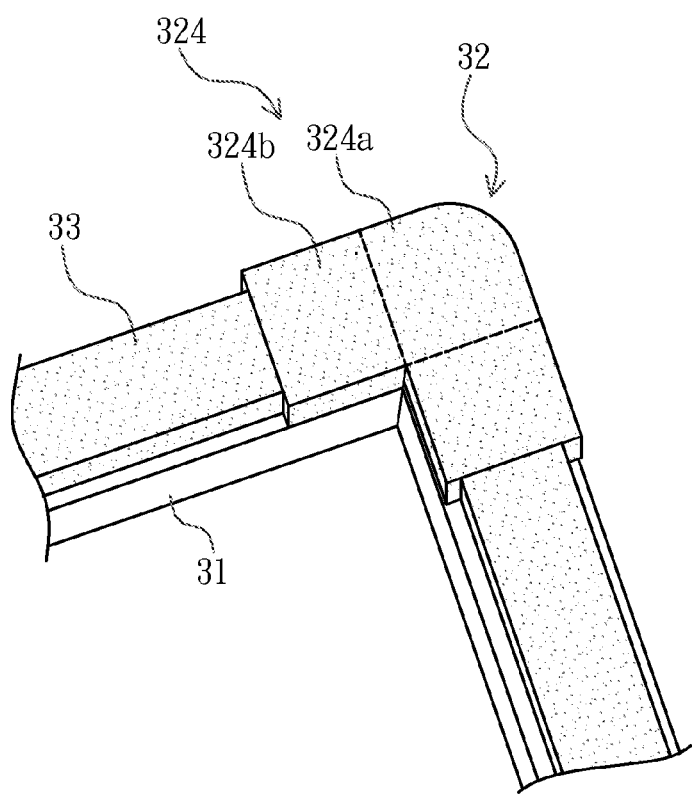
FIG. 5 is an assembled perspective view of the corner assembly of the tonneau cover system according to the first embodiment of the present invention, from an upside-down view angle.
Figure 6:
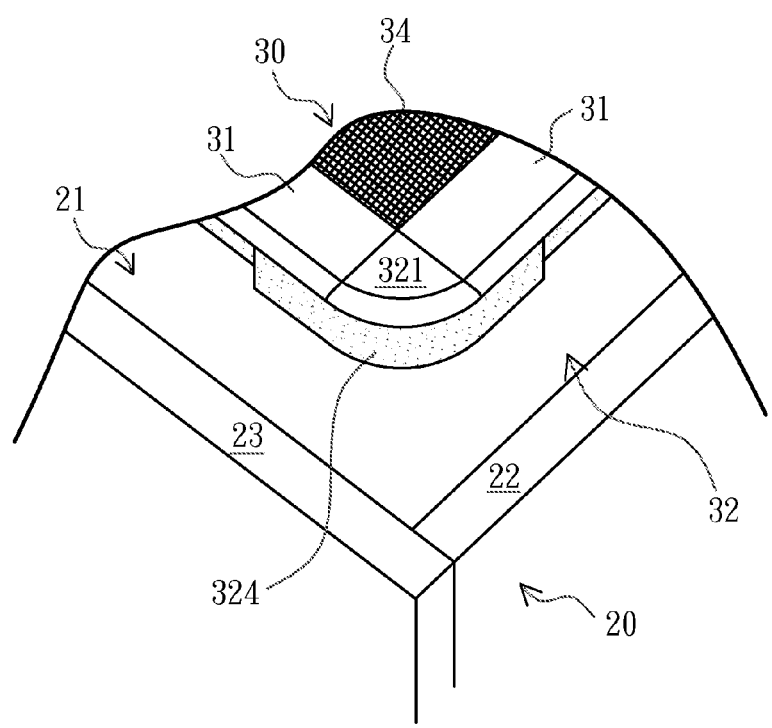
FIG. 6 is an operational view of the corner assembly of the tonneau cover system according to the first embodiment of the present invention.

Referring now to FIGS. 4, 5 and 6, a corner assembly for a tonneau cover system of a pick-up truck according to a first embodiment of the present invention is illustrated. As shown, a tonneau cover system 30 is used to cover a cargo box 21 of a pick-up truck 20 and is preferably a foldable type tonneau cover which is similar to the foldable tonneau cover system 10 as shown in FIG. 1, and thus the tonneau cover system 30 is also provided with a plurality of frame sections, a plurality of cover portions 34, a plurality of hinges and a plurality of clamps (not-shown), wherein most of the frame sections, the cover portions 34, the hinges and the clamps of the tonneau cover system 30 are similar to that of the foldable tonneau cover system 10, so that the detail descriptions of these similar components of the tonneau cover system 30 will be omitted hereinafter and can be referenced by the foregoing descriptions of the foldable tonneau cover system 10 as shown in FIG. 1. However, according to the present invention, the tonneau cover system 30 has a plurality of corner assemblies 32 structurally different from the corner assemblies 13 of the foldable tonneau cover system 10. In the first embodiment of the present invention, each of the frame sections of the tonneau cover system 30 is constructed by a plurality of frame members 31, all of which are made of metal (such as steel, stainless steel, copper, aluminum, equivalent rigid metal or alloy thereof), engineering plastic or even wood. One of the frame sections can be pivotally connected to another adjacent frame section through two or more of the hinges, so that all of the frame sections can be adjusted to an extended position or a storage position. Furthermore, the tonneau cover system 30 can optionally only include a single frame section and a single cover portion 34 covering thereon, while the cover portion 34 can be made of flexible or rigid material.

Referring to FIG. 4, in the first embodiment of the present invention, each of the frontmost and rearmost frame sections of the tonneau cover system 30 has two corner assemblies 32 for connecting adjacent frame members 31 thereof, wherein one of the corner assemblies 32 can be used to connect between two vertically-arranged frame members 32. Each of the corner assemblies 32 has a corner member 321, a lid member 322, at least one screw member 323 and a lengthened cushion member 324. The corner member 321 is made of plastic material, such as engineering plastic, mainly including polyamide 6 (PA6), polyamide 66 (PA66), polypropylene (PP), acrylonitrile-butadiene-styrene (ABS) copolymer, polycarbonate (PC), polybutylene terephthalate (PBT) and etc, but not limited thereto. The corner member 321 is substantially fan-shape, and mainly has two insertion portions 321a and a connection surface 321b, wherein the two insertion portions 321a are two protrusions extended from two adjacent side surfaces of the corner member 321 for being inserted into two installation holes (not-shown) of the two adjacent frame members 31, while the connection surface 321b is an upper surface of the corner member 321 as shown in FIG. 4.

Moreover, referring to FIG. 4, the connection surface 321b is formed with a stepped recess 321c, a plurality of ribs 321d, a plurality of cavities 321e and at least one thread hole 321f, wherein the stepped recess 321c is a recessed socket of the connection surface 321b for combining with the lid member 322. The ribs 321d, the cavities 321e and the thread hole 321f are formed in the stepped recess 321c, i.e. formed on a lower surface of the stepped recess 321c. The cavities 321e are used to reduce material cost of the corner member 321, while the ribs 321d are protruded ribs formed in the cavities 321e (or between the cavities 321e) and used to enhance the structural strength of the corner member 321 having the cavities 321e. The shape of the ribs 321d and the cavities 321e can be various shapes and can be varied according to actual product needs. The at least one thread hole 321f is preferably formed on at least one of the ribs 321d, wherein the thread hole 321f has an inner thread used to screw-connect with the screw member 323.

In addition, referring to FIG. 4, the lid member 322 is a substantially planar plate made of plastic material, such as engineering plastic the same as that of the corner member 321. The lid member 322 has a size matched with that of the stepped recess 321c of the corner member 321, and a thickness matched with the depth of the stepped recess 321c. The lid member 322 is formed with at least one through hole 322a corresponding to the at least one thread hole 321f and the at least one screw member 323, wherein the number of the through hole 322a, the thread hole 321f and the screw member 323 are the same, such as one, two or more, without limitation. In the first embodiment, the number thereof is preferably two. The screw members 323 are generally made of metal material, such as iron, stainless steel and etc. In installation, the lid member 322 can be embedded into the stepped recess 321c, and then the upper surface of the lid member 322 will be preferably flush with the connection surface 321b. Then, the screw members 323 are used to pass through the through holes 322a and screw-connect to the screw holes 321f, so as to stably mount the lid member 322 in the stepped recess 321c of the corner member 321, wherein the lid member 322 completely covers the ribs 321d and the cavities 321e.

Referring to FIGS. 4, 5 and 6, in the first embodiment of the present invention, the lengthened cushion member 324 is a thick L-shaped block made of synthetic sponge material having elastic resilience, such as EVA (ethylene vinyl acetate), EPDM (ethylene-propylene-diene copolymer), CR (chloroprene) rubber, open cell urethane foam, polyurethane foam, expanded polypropylene, thermosetting plastic foams, thermoplastic polyolefin or equivalent thereof. According to the present invention, the lengthened cushion member 324 has a corner cushion portion 324a and two extension cushion portions 324b integrally extended from two adjacent sides of the corner cushion portion 324a. As shown in FIG. 5, in installation, the corner cushion portion 324a is attached to the connection surface 321b of the corner member 321, and the two extension cushion portions 324b are attached to two surfaces of a portion of the two adjacent frame members 31, respectively. Preferably, the shape of the corner cushion portion 324a is substantially corresponding or equal to the fan-shape of the connection surface 321b of the corner member 321, while the shape of each of the two extension cushion portions 324b is substantially corresponding or equal to a rectangular or square shape of the portion of the two adjacent frame members 31. Moreover, the extension length of the extension cushion portion 324b from the side of the corner cushion portion 324a is ranged from about 0.5 cm to 10.0 cm, preferably from about 1.0 cm to 7.0 cm, such as 2, 3, 4, 5 or 6 cm.

Moreover, referring to FIGS. 4, 5 and 6, the frame members of the frame sections of the tonneau cover system 30 further have a plurality of cushion strips 33, wherein the cushion strips 33 can be made of synthetic sponge material having elastic resilience, such as material the same as that of the lengthened cushion member 324. Two of the cushion strips 33 are attached to the surfaces of remaining portions of the frame members 31 and adjacent to the two extension cushion portions 324b of the lengthened cushion member 324. The cushion strips 33 have a thickness slightly smaller than that of the two extension cushion portions 324b.

Referring to FIG. 6, an operational view of the corner assembly 32 of the tonneau cover system 30 according to the first embodiment of the present invention is illustrated. When the tonneau cover system 30 is horizontally extended on upper surfaces of side walls 22 and a tailgate 23 of the cargo box 21 of the pick-up truck 20, a lower surface of the lengthened cushion member 324 of the corner assembly 32 will be tightly in contact with upper surfaces of the side walls 22 (and the tailgate 23) due to the gravity and the clamping force of the clamps (not-shown) of the tonneau cover system 30. Thus, the lengthened cushion member 324 of the corner assembly 32 can absorb vibration and prevent from impact between the frame members 31 of the frame section and the cargo box 21 and thus reduces noise generated due to the impact. It should be noted that the connection surface 321b of the corner member 321 is formed with a stepped recess 321c, the lid member 322 is embedded in the stepped recess 321c to cover the ribs 321d and cavities 321e in the stepped recess 321c, and the lengthened cushion member 324 is L-shaped and attached to the connection surface 321b of the corner member 321 and two surfaces of a portion of the two adjacent frame members 31. Thus, the lid member 322 is supported by the ribs 321d, the corner cushion portion 324a of the lengthened cushion member 324 is fully supported by the lid member 322, and the two extension cushion portions 324b are of the lengthened cushion member 324 is stably supported by the surfaces of the portion of the two adjacent frame members 31, so that it can efficiently maintain the effective buffering thickness of the lengthened cushion member 324, and prevent from the deformation problem of the traditional cushion member 132. As a result, the vibration can be absorbed, and the impact between the frame members 31 of the frame section and the cargo box 21 can be prevented, so as to thus reduce or eliminate noise generated due to the impact.

Figure 2:
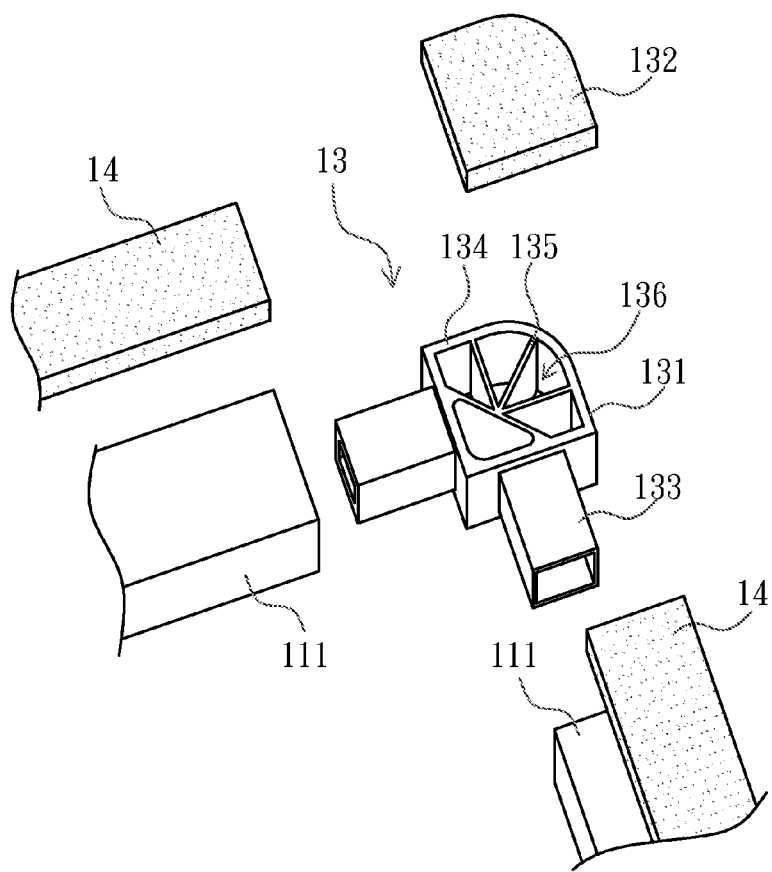
FIG. 2 is an exploded perspective view of a corner assembly of the traditional foldable tonneau cover system from an upside-down view angle.
Figure 3:
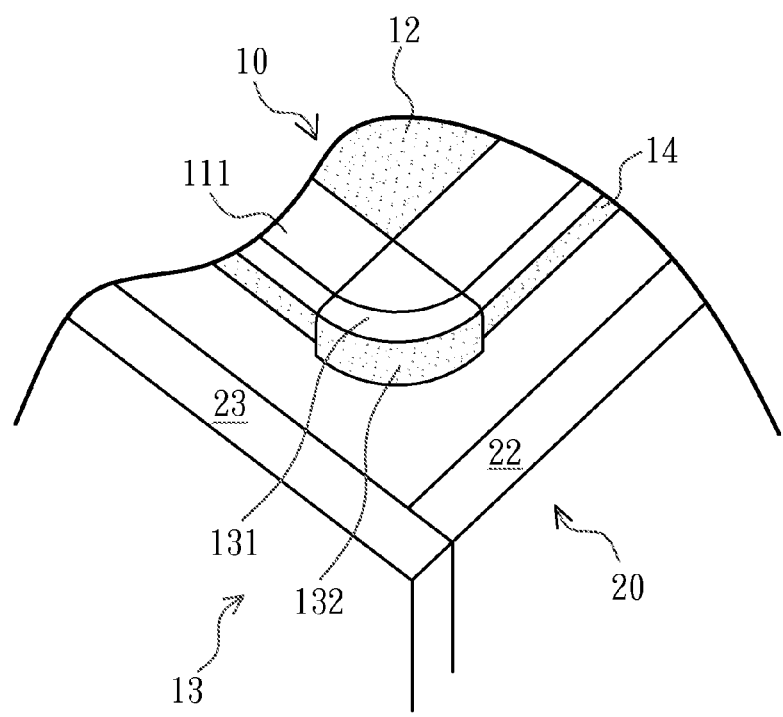
FIG. 3 is an operational view of the corner assembly of the traditional foldable tonneau cover system.

As described above, in comparison with the traditional cushion member 132 of the corner assembly 13 as shown in FIGS. 2 and 3, the corner assembly 32 of the present invention as shown in FIGS. 4 to 6 has a corner member 321, a lid member 322 and a lengthened cushion member 324, wherein the connection surface 321b of the corner member 321 is formed with a stepped recess 321c; the lid member 322 is embedded in the stepped recess 321c to cover ribs 321d and cavities 321e in the stepped recess 321c; and the lengthened cushion member 324 is L-shaped and attached to the connection surface 321b of the corner member 321, the lid member 322 and two surfaces of two adjacent frame members 31. Thus, it can efficiently maintain the effective buffering thickness of the lengthened cushion member 324, absorb vibration, and prevent from impact between frame members 31 and a cargo box 21 to thus reduce or eliminate noise.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A tonneau cover system of a pick-up truck, comprising:
    two adjacent frame members, wherein each one of the two adjacent frame members has an installation hole and a portion;
    a corner member having: two insertion portions inserted into the installation holes of the two adjacent frame members, respectively; and a connection surface formed with a stepped recess, a plurality of ribs and a plurality of cavities, wherein the ribs and the cavities are formed in the stepped recess; the corner member is further formed with at least one thread hole, and the at least one thread hole is formed on at least one of the ribs;
    a lid member stably embedded in the stepped recess to cover the ribs and the cavities, wherein the lid member is formed with at least one through hole corresponding to the thread hole; and
    a lengthened cushion member being L-shaped and having a corner cushion portion and two extension cushion portions integrally extended from two adjacent sides of the corner cushion portion, wherein the corner cushion portion is attached to the connection surface of the corner member and the lid member, and the two extension cushion portions are attached to two surfaces of a portion of the two adjacent frame members, respectively; wherein the corner cushion portion of the lengthened cushion member is supported by the lid member.

2. The tonneau cover system according to claim 1, further comprising: at least one screw member which passes through the through hole and screw-connects to the screw hole, so as to stably mount the lid member in the stepped recess of the corner member.

3. The corner assembly according to claim 1, wherein the lid member is formed with at least one protrusion, and the protrusion is embedded into at least one of the cavities in the stepped recess of the corner member.

4. The corner assembly according to claim 1, further comprising: a buffering filler which is filled in the cavities and the stepped recess of the corner member, so as to stably mount the lid member in the stepped recess of the corner member.

5. The corner assembly according to claim 4, wherein the buffering filler is made of thermoplastic or thermosetting adhesive material.

6. The corner assembly according to claim 1, wherein a plurality of ultrasonic welding portions are formed on a boundary region between the lid member and the stepped recess of the corner member.

7. The corner assembly according to claim 1, wherein a surface of the lengthened cushion member away from the lid member and the corner member is further provided with a soft magnetic sheet.

8. The corner assembly according to claim 1, wherein each of the corner cushion portion and the two extension cushion portions of the lengthened cushion member is provided with at least one hole to receive at least one rubber post.

* * * * *